(12) United States Patent
Anderson et al.

(10) Patent No.: US 10,899,993 B2
(45) Date of Patent: Jan. 26, 2021

(54) EXTRACTOR HAVING A SOLVENT DRAINAGE ZONE

(71) Applicant: Crown Iron Works Company, Roseville, MN (US)

(72) Inventors: George E. Anderson, Champlin, MN (US); Richard Ozer, Golden Valley, MN (US)

(73) Assignee: Crown Iron Works Company, Blaine, MN (US)

( * ) Notice: Subject to any disclaimer, the term of this patent is extended or adjusted under 35 U.S.C. 154(b) by 180 days.

(21) Appl. No.: 15/750,624

(22) PCT Filed: Aug. 5, 2016

(86) PCT No.: PCT/US2016/045785
§ 371 (c)(1),
(2) Date: Feb. 6, 2018

(87) PCT Pub. No.: WO2017/027381
PCT Pub. Date: Feb. 16, 2017

(65) Prior Publication Data
US 2018/0265802 A1 Sep. 20, 2018

Related U.S. Application Data

(60) Provisional application No. 62/202,474, filed on Aug. 7, 2015.

(51) Int. Cl.
*B01D 11/02* (2006.01)
*C11B 1/10* (2006.01)

(52) U.S. Cl.
CPC ............ *C11B 1/102* (2013.01); *B01D 11/023* (2013.01); *B01D 11/0226* (2013.01); *B01D 11/0288* (2013.01); *B01D 11/0203* (2013.01)

(58) Field of Classification Search
CPC ............ B01D 11/0288; B01D 11/0226; B01D 11/023; B01D 11/0203; C11B 1/102
See application file for complete search history.

(56) References Cited

U.S. PATENT DOCUMENTS 4,375,264 A 3/1983 Porter
4,751,060 A 6/1988 Kratochwill
(Continued)

FOREIGN PATENT DOCUMENTS

CN 102851113 A 1/2013
CN 203060886 U 7/2013
(Continued)

OTHER PUBLICATIONS

International Patent Application No. PCT/US2016/045785, International Search Report and Written Opinion dated Oct. 26, 2016, 15 pages.
(Continued)

*Primary Examiner* — Randy Boyer
*Assistant Examiner* — Juan C Valencia
(74) *Attorney, Agent, or Firm* — Fredrikson & Byron, P.A.

(57) ABSTRACT

An immersion extractor may have a housing that maintains a solvent pool in which solids material being processed is immersed during operation. One or more bed decks can be positioned inside of the housing to provide multiple extraction stages. In some examples, a final bed deck extends from below a solvent level maintained in the housing to above the solvent level such that solids material is conveyed out of the solvent pool and toward a feed outlet at the end of extraction. The bed deck may include a drainage section positioned between the top of the solvent level in the extractor and the feed outlet, allowing solvent to drain out of the solids material before being discharged through the feed outlet, thereby increasing the efficiency of the extraction process.

14 Claims, 2 Drawing Sheets

(56) References Cited

U.S. PATENT DOCUMENTS

| | | |
|---|---|---|
| 5,408,924 A | 4/1995 | Arendt et al. |
| 5,591,416 A | 1/1997 | Kemper et al. |
| 5,770,082 A | 6/1998 | Anderson |
| 5,891,433 A | 4/1999 | Silver |
| 10,245,526 B2 * | 4/2019 | White .................. B01D 11/023 |
| 2014/0193303 A1 | 7/2014 | Ellis et al. |

FOREIGN PATENT DOCUMENTS

| | | |
|---|---|---|
| CN | 104474735 A | 4/2015 |
| WO | 2005100518 A1 | 10/2005 |
| WO | 2006102685 A1 | 9/2006 |
| WO | 2009041929 A1 | 4/2009 |
| WO | 2010059919 A2 | 5/2010 |
| WO | 2013159024 A1 | 10/2013 |
| WO | 2015179530 A1 | 11/2015 |
| WO | 2017027415 A1 | 2/2017 |
| WO | 2017027416 A1 | 2/2017 |
| WO | 2017035012 A1 | 3/2017 |

OTHER PUBLICATIONS

International Patent Application No. PCT/US2016/045892, International Search Report and Written Opinion dated No. 1, 2016, 13 pages.

International Patent Application No. PCT/US2016/045889, International Search Report and Written Opinion dated Oct. 26, 2016, 13 pages.

* cited by examiner

EXTRACTOR HAVING A SOLVENT DRAINAGE ZONE

RELATED APPLICATIONS

This application is a 35 U.S.C. 371 national stage filing from International Application No. PCT/US2016/045785, filed Aug. 5, 2016, which claims priority to U.S. Provisional Application No. 62/202,474, filed Aug. 7, 2015. The entire contents of both these applications are incorporated herein by reference.

TECHNICAL FIELD

This disclosure relates to solvent extraction and, more particularly, to liquid-solvent extractors.

BACKGROUND

A variety of different industries use extractors to extract and recover liquid substances entrained within solids. For example, producers of oil from renewable organic sources use extractors to extract oil from oleaginous matter, such as soybeans, rapeseed, sunflower seed, peanuts, cottonseed, palm kernels, and corn germ. The oleaginous matter is contacted with an organic solvent within the extractor, causing the oil to be extracted from a surrounding cellular structure into the organic solvent. As another example, extractors are used to recover asphalt from shingles and other petroleum-based waste materials. Typically, the petroleum-based material is ground into small particles and then passed through an extractor to extract the asphalt from the solid material into a surrounding organic solvent.

Regardless of the application in which an extractor is used, manufacturers and operators of extractors are continuously looking for ways to improve the economic efficiency of their extractor operation. This can involve controlling the extractor to maximize the amount of extract recovered from a given feedstock while minimizing the amount of solvent lost during extraction and recovery. This can also involve operating the extractor harder by increasing the feedstock flow rate through the extractor. Unfortunately, attempts to increase feedstock flow rate through an extractor often result in a corresponding decrease in extract recovery. This can occur when the feedstock does not have sufficient residence time within the extractor and/or the increased feedstock volume inhibits proper intermixing between the extraction solvent and the feedstock.

SUMMARY

In general, the present disclosure is directed to an extractor that has a housing containing a solvent pool through which solids material being processed travels during operation. The housing can contain multiple bed decks to provide surfaces along which the material being processed travels through the extractor and that defines different extraction stages. At least one of the bed decks, such as the final bed deck in the direction of material travel, can extend from below the solvent level in the housing to above the solvent level. As solids material being processed travels along this bed deck, the material may travel out of the solvent pool and begin draining entrained solvent along the surface of the non-porous bed deck back into the solvent pool. In some examples, the bed deck is configured with a drainage section, such as a region of porosity, that allows residual solvent to drain through the bed deck rather than flowing back down the bed deck. This configuration can increase the efficiency of the extractor system.

In one example, an immersion extractor is described that includes a housing and at least one bed deck. The housing is configured to maintain a solvent pool in which a solids material being processed is immersed during operation of the extractor. The bed deck is positioned inside the housing and providing a surface along which the solids material is conveyed during operation of the extractor. The example specifies that the bed deck extends from below a solvent level maintained in the housing to above the solvent level so as to convey the solids material out of the solvent pool and toward a feed outlet. The example also specifies that the bed deck includes a drainage section positioned between the solvent level and the feed outlet.

In another example, a method is describes that includes conveying solids material being processed through a solvent pool of an immersion extractor and conveying the solids material being processed along a surface of a bed deck that has a receiving end located inside of the solvent pool and a discharge end located outside of the solvent pool. The example specifies that the bed deck includes a drainage section in a portion of the bed deck located outside of the solvent pool such that conveying the solids material being processed along the surface of the bed deck comprises conveying the solids material being process over the drainage section of the bed deck. The method further involves draining solvent entrained in the solids material being processed out through the drainage section of the bed deck as the solids material being processed is conveyed over the drainage section.

The details of one or more examples are set forth in the accompanying drawings and the description below. Other features, objects, and advantages will be apparent from the description and drawings, and from the claims.

DETAILED DESCRIPTION

In general, the disclosure relates to liquid-solid countercurrent extraction processes that enable the extraction of one or more desired products from solid material flows. In some examples, an extractor conveys a continuous flow of material from its inlet to its outlet while a solvent is conveyed in a countercurrent direction from a solvent inlet to a solvent outlet. As the solvent is conveyed from its inlet to its outlet, the concentration of extracted liquid relative to solvent increases from a relatively small extract-to-solvent ratio to a comparatively large extract-to-solvent ratio. Similarly, as the solid material is conveyed in the opposing direction, the concentration of extract in the solid feedstock decreases from a comparatively high concentration at the inlet to a comparatively low concentration at the outlet. The amount of time the solid material remains in contact with the solvent within the extractor (which may also be referred to as residence time) can vary, for example depending on the material being processed and the operating characteristics of the extractor, although will typically be within the range of 15 minutes to 3 hours, such as from 1 hour to 2 hours.

Figure 1:
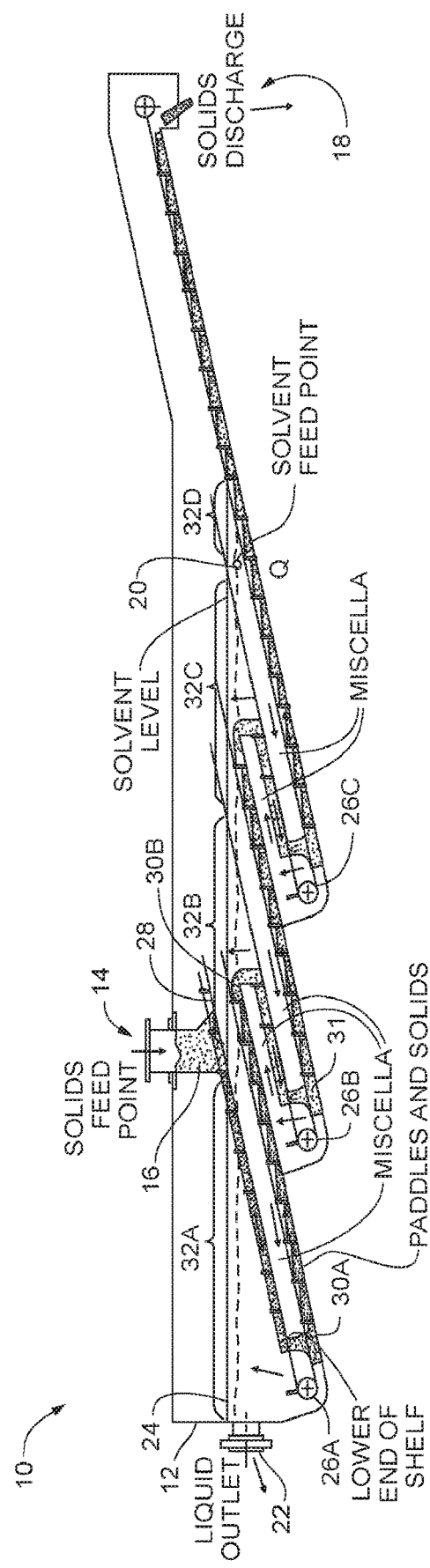
FIG. 1 is a side view of an example extractor that can be used to process a continuous flow of solid material.

FIG. 1 is a side view of an example extractor 10 that can be used to process a continuous flow of solid material carrying one or more compounds desired to be extracted into a solvent. As shown in this example, extractor 10 includes a housing 12 containing one or more extraction stages through which a material being processed travels in a countercurrent direction with an extraction solvent. Housing 12 includes a feed inlet 14 configured to receive a continuous flow of solids material 16 carrying an extract to be extracted within extractor 10. Extractor 10 also includes a feed outlet 18 configured to discharge the solids material 16 after some or all of the extract has been extracted into solvent flowing through the extractor.

To provide a flow of solvent passing through extractor 10, housing 12 also includes a solvent inlet 20 that receives a solvent devoid of extract or having a comparatively low concentration of extract. A solvent outlet 22 is provided on a generally opposite end of housing 12 to discharge solvent having passed through extractor 10. As solvent travels through housing 12 from inlet 20 to outlet 22, the solvent flows in a countercurrent direction from the flow of solids material 16 passing through the extractor. The solvent intermixes with solids material 16 within extractor 10, causing the extract carried by the solids material to transfer from the solids material to the solvent. Accordingly, in operation, solvent having a comparatively low concentration of extract enters at inlet 20 while solvent having in increased concentration of extract discharges at outlet 22. Likewise, fresh solids material 16 carrying extract enters at inlet 14 while processed solids material having a reduced concentration of extract is discharged at outlet 18. For example, in instances where solids material 16 is an oil-bearing material, solvent can extract oil out of the solids material forming a miscella (the solution of oil in the extraction solvent) that is discharged through outlet 22.

Extractor 10 can process any desired solids material 16 using any suitable solvent. Example types of solids material 16 that can be processed using extractor 10 include, but are not limited to, oleaginous matter, such as soybeans (and/or soy protein concentrate), rapeseed, sunflower seed, peanuts, cottonseed, palm kernels, and corn germ; oil-bearing seeds and fruits; asphalt-containing materials (e.g., asphalt-containing roofing shingles that include an aggregate material such as crushed mineral rock, asphalt, and a fiber reinforcing); stimulants (e.g., nicotine, caffeine); alfalfa; almond hulls; anchovy meals; bark; coffee beans and/or grounds; carrots; chicken parts; chlorophyll; diatomic pellets; fish meal; hops; oats; pine needles; tar sands; vanilla; and wood chips and/or pulp. Solvents that can be used for extraction of solids material 16 include, but are not limited to, acetone, hexane, toluene, isopropyl alcohol, ethanol, other alcohols, and water.

Extractor 10 can be operated as an immersion extractor in which a pool or reservoir of solvent 24 is maintained in housing 12 to provide a desired solvent level inside the extractor. In such applications, solids material 16 is immersed (e.g., submerged) in the pool of solvent 24 as it moves through extractor 10. In some examples, solids material 16 remains completely submerged in the pool of solvent 24 as it travels through extractor 10, e.g., except when adjacent inlet 14 and outlet 18. In other examples, solids material 16 travels above the pool of solvent 24 at different stages in extractor 10 before falling off the end of a conveyor and dropping back into the pool of solvent. As one example, extractor 10 may be implemented using a Model IV extractor commercially available from Crown Iron Works Company of Minneapolis, Minn.

To contact solids material 16 with solvent inside of extractor 10, the extractor has one or more conveyors that convey the material in a countercurrent direction through the pool of solvent 24. In the configuration of FIG. 1, for instance, extractor 10 has three conveyors 26A, 26B, 26C that convey solids material 16 through the solvent pool 24 contained within housing 12. Solids material 16 can travel along decks or trays 28 positioned inside of extractor 10 to define a bed of material. Each bed deck 28 may define a receiving end 30A and a discharge end 30B. In operation, solids material 16 can drop onto the receiving end 30A of the bed deck 28 and then be conveyed along the bed deck by the conveyor until reaching the discharge end 30B. Upon reaching discharge end 30B, solids material 16 can drop off or fall over the terminal edge of the bed deck, for example, onto a lower bed deck.

The vertical distance separating the discharge end 30B of an upper bed deck 28 from a receiving end 30A of a lower bed deck 28 may provide a mixing or drop zone 32 through which solids material 16 travels. For example, solids material 16 dropping off the discharge end 30B of an upper bed deck 28 can mix and interact with solvent located between the upper bed deck and a lower bed deck in drop zone 31, e.g., as the solids material falls under the force of gravity toward the lower bed deck. A desired extract carried by the solids material 16 can be extracted into the solvent within this drop zone as the solids material intermixes with the solvent within the drop zone. Increasing the number bed decks 28 within extractor 10 and, correspondingly, the number of drop zones between bed decks, can increase the amount of extract recovered from a specific solids material 16 being processed on the extractor.

Extractor 10 can have any suitable number of bed decks 28 arranged in any desired orientation. In the example, of FIG. 1, extractor 10 is illustrated as having six bed decks 28, although the extractor can have fewer bed decks or more bed decks. In addition, in this example, bed decks 28 are arranged at an inclined angle such that the bed decks are alternatingly sloped downwardly and upwardly. Bed decks 28 may be arranged in series with adjacent bed decks being vertically and/or laterally offset from one another to provide adjacent flow pathways over which solids material 26 travels when passing through extractor 10. For example, bed decks 28 may be arranged in parallel to define a serpentine pathway along which solids material 16 is conveyed through pool of solvent 24 between inlet 14 and outlet 18. In operation, solids material 26 may travel along a downwardly sloped bed deck 28 before dropping onto an upwardly sloped lower bed deck, at which point the solids material reverses direction and travels laterally and vertically in an opposed direction from the direction of travel on the upper bed deck.

In the example of FIG. 1, solids material 16 enters extractor 10 via inlet 14 and falls onto a first downwardly sloped bed deck. Conveyor 26A moves solids material 16 from the receiving end of the first downwardly sloped bed deck to the discharge end of the first downwardly sloped bed deck, whereupon the solids material drops off of the deck through a first drop zone onto a first upwardly sloped bed deck. Conveyor 26A moves solids material 16 from the receiving end of this first upwardly sloped bed deck to the discharge end of this bed deck, whereupon the solids material drops off of the deck through a second drop zone onto a second downwardly sloped bed deck. Conveyor 26B moves solids material 16 from the receiving end of the second downwardly sloped bed deck to the discharge end of this bed deck, whereupon the solids material drops off of the deck through a third drop zone onto a second upwardly sloped bed deck. Conveyor 26B moves solids material 16 from the receiving end of this second upwardly sloped bed deck to the discharge end of the bed deck, whereupon the solids material drops off of the deck through a third drop zone onto a third downwardly sloped bed deck. Conveyor 26C moves solids material 16 from the receiving end of the third downwardly sloped bed deck to the discharge end of this bed deck, whereupon the solids material drops off of the deck through a fourth drop zone onto a third upwardly sloped bed deck. Finally, conveyor 26C moves solids material 16 along this final bed deck out of the solvent pool 24 and discharges the processed solids material via outlet 18.

In some examples, the pool of solvent 24 contained within housing 12 is divided into fluidly interconnected sub-pools, e.g., to provide different equilibrium extraction stages. For example, bed decks 28 may provide physical barriers that separate each sub-pool from each adjacent sub-pool and prevent solvent from flowing through the bed deck. In such examples, solvent may flow around the discharge end 30B of each bed deck rather than through the bed deck, allowing the solvent to flow in a countercurrent direction from solids material 16 through extractor 10. Other physical divider structures in addition to or in lieu of bed decks 28 can be used to separate the pool of solvent 24 in different sections.

In the example of FIG. 1, extractor 10 is illustrated as having four solvent pools 32A-32D. Each downwardly sloping bed deck 28 provides a barrier between adjacent pools with adjacent solvent pools being connected at the discharge end of a separating bed deck. In operation, each solvent pool of pools 32A-32D may have a different average extract-to-solvent concentration ratio to provide different stages of extraction. The concentration ratio may progressively increase from a lowest concentration adjacent solvent inlet 20 to a highest concentration adjacent solvent or miscella outlet 22.

Solids material 16 processed in extractor 10 is conveyed out of solvent pool 24 and discharged through outlet 18 via a conveyor. In the configuration of FIG. 1, for instance, conveyor 26C conveys solids material 16 out of solvent pool 24 towards outlet 18. Residual solvent retained by processed solids material 16 can drain under the force of gravity back into solvent pool 24. For this reason, the final bed deck or discharge deck 28 along which solids material 16 travels towards outlet 18 may be sloped upwardly away from solvent pool 24. Solvent carried with solids material 16 out of solvent pool may drain down the sloped bed deck back into the solvent pool, helping to minimize the amount of solvent carried out extractor 10 by the processed solids material being discharged from the extractor.

Figure 2:
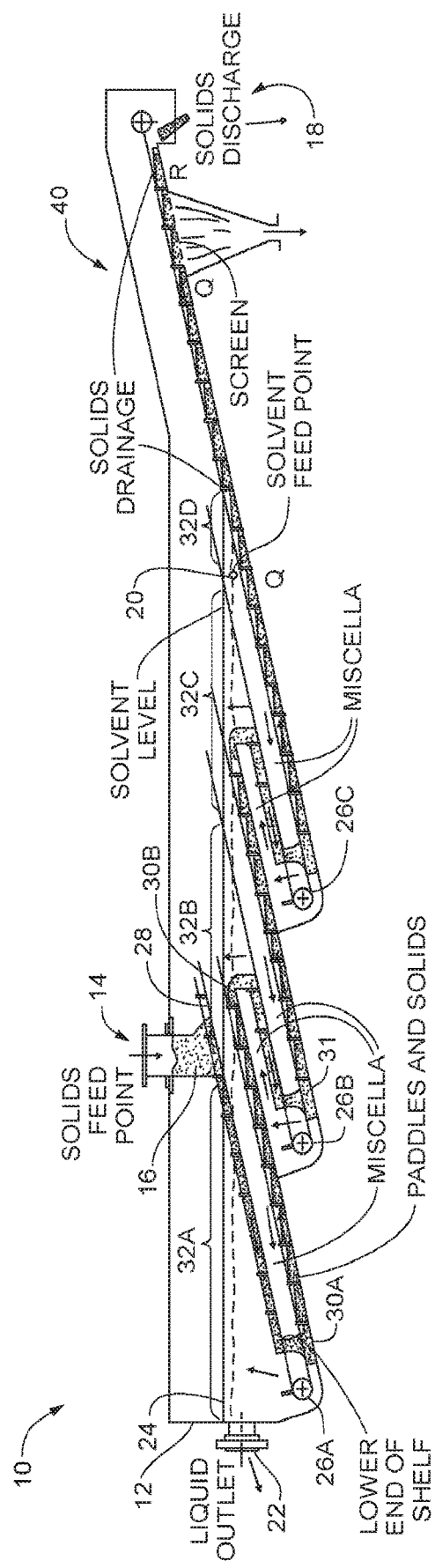
FIG. 2 is a side view of an example configuration of the extractor of FIG. 1 showing an example solvent drainage zone in accordance with the disclosure.

FIG. 2 is a side view of an example configuration of the extractor of FIG. 1 showing an example solvent drainage zone in accordance with the disclosure. As shown in this example, the final bed deck 28 configured to convey solids material 16 out of solvent pool 24 and to discharge 18 contains a drainage section 40. Drainage section 40 may provide openings extending through bed deck 28 over which solids material 16 travels. For example, drainage section may be a gap or cutout section of bed deck 28 covered with a screen have openings smaller than the size of solids material 16. Bed deck 28 may be solid (e.g., non-perforated) on either side of drainage section 40. Drainage section 40 can provide a cross-flow region through which entrained solvent carried by solids material can drop vertically under the force of gravity. That is, rather than requiring the entrained solvent to flow down the sloped bed deck 28 back into solvent pool 24, the solvent can drop through openings in drainage section. Solvent recovered from drainage section 40 can be returned to solvent pool 24 in extractor 10, e.g., via piping connecting drainage section 40 to housing 12.

In operation, conveyor 26C can convey solvent-wet solids material 26 out of solvent pool 32D and along the final bed deck 28. As the conveyor pushes and/or pulls the material along the final bed deck, the material being conveyed may pass over and in contact with drainage section 40. For example, the conveyors in extractor 10 (including conveyor 26C) may include laterally spaced endless link chains and a plurality of longitudinally spaced flights that extend transversely of the chains. Solids material 26 may be positioned between and dragged by opposed flights, causing the solids material to traverse along a bed deck without having conveyor block solvent drainage over drainage section 40.

By configuring extractor 10 with drainage section 40 along the sloped bed deck leading out of housing 12, the amount of solvent recovered from the processed solids material discharging from the extractor can be increased. This can reduce the amount of make-up solvent required to be added to extractor 10. This can also reduce the amount of energy needed to dry the discharged solids material during downstream processing. As shown, a collection conduct can be positioned under the drainage section 40 to collect solvent draining through the drainage section of the final bed deck 28, for example, for recycle and/or reuse.

When used, drainage section 40 can have any suitable length and width. Further, although FIG. 2 only illustrates the discharge bed deck as having a single drainage section 40, in practice, an extractor bed deck can have two or more drainage sections separated by bed deck that does not contain perforations. In some examples, extractor 10 has a drainage section having a length (e.g., from Q to R shown on FIG. 2) ranging from 0.1 meters to 5 meters, such as from 0.2 meters to 3 meters, or 0.5 meters to 1.5 meters.

When drainage section 40 is implemented using a drainage screen, the screen can reduce the content of liquid in the solids when they discharge. Without the screen, liquid may be partly left behind as the solids emerge from the solvent pool just after the solvent feed point. For example, fresh incoming solvent may flow down the slope of the discharge bed deck slightly faster than the processed solids material go up the slope, e.g., so that the percent liquid is reduced as the solids approach outlet 18. By positioning drainage section 40 on the discharge bed deck 28 and downstream of solvent inlet 20, the drainage section can reduce solvent entrainment in the processed solids material by providing cross-flow, which can occur even if the conveyor speed (e.g., chain speed) is higher than would allow backflow of liquid at the degree of saturation of material.

Although not illustrated on FIG. 2, drainage section 40 may incorporate a solvent wash (liquid spray) directed upwards against a screen covering the drainage section. This solvent wash can help minimize the blinding of screen gaps as the solids material is dragged over the screen toward the discharge. An example screen wash system is described in US Patent Publication No. 2015/0336035, entitled "EXTRACTOR WITH SCREEN WASHING SYSTEM," the entire contents of which are incorporated herein by reference.

Various examples have been described. These and other examples are within the scope of the following claims.

The invention claimed is:

1. An immersion extractor comprising:
   a housing configured to maintain a solvent pool in which a solids material being processed is immersed during operation of the extractor; and at least one bed deck positioned inside the housing and providing a surface along which the solids material is conveyed during operation of the extractor;

wherein the at least one bed deck extends from below a solvent level maintained in the housing to above the solvent level so as to convey the solids material out of the solvent pool and toward a feed outlet, and wherein the at least one bed deck comprises a drainage section positioned between the solvent level and the feed outlet, the drainage section comprises a screen covering an opening in the at least one bed deck through which solvent can drain, and further comprising a sprayer configured to direct solvent upward against the screen covering the drainage section.

2. The immersion extractor of claim 1, wherein the opening has a length ranging from 0.1 meters to 5 meters.

3. The immersion extractor of claim 1, wherein the at least one bed deck is a final bed deck in the immersion extractor in a direction of travel for the solids material being processed, and the final bed deck is positioned between a solvent inlet and the feed outlet.

4. The immersion extractor of claim 3, wherein the solvent inlet is positioned to direct incoming solvent on the final bed deck, causing the incoming solvent to flow into the solvent pool in an opposite direction from a direction solids material is conveyed out of the solvent pool along the final bed deck.

5. The immersion extractor of claim 1, further comprising a conveyor operable to convey the solids material being processed along the at least one bed deck and over the drainage section.

6. The immersion extractor of claim 1, wherein the at least one bed deck is sloped upwardly away from the solvent pool such that solvent carried by solids material traveling along the bed deck is configured to drain under the force of gravity back into the solvent pool.

7. The immersion extractor of claim 6, wherein the at least one bed deck is sloped upwardly at an angle ranging from 20 degrees to 60 degrees with respect to ground.

8. The immersion extractor of claim 1, further comprising piping in fluid communication with the drainage section to collect and convey drained solvent.

9. A method comprising:
conveying solids material being processed through a solvent pool of an immersion extractor, conveying the solids material being processed along a surface of a bed deck that has a receiving end located inside of the solvent pool and a discharge end located outside of the solvent pool, wherein the bed deck includes a drainage section in a portion of the bed deck located outside of the solvent pool such that conveying the solids material being processed along the surface of the bed deck comprises conveying the solids material being processed over the drainage section of the bed deck, draining solvent entrained in the solids material being processed out through the drainage section of the bed deck as the solids material being processed is conveyed over the drainage section, wherein draining solvent entrained in the solids material being processed out through the drainage section of the bed deck comprises draining solvent entrained in the solids material through openings in a screen covering an opening of the bed deck under a force of gravity, and spaying solvent upwardly against a bottom surface of the screen to help prevent plugging of the screen.

10. The method of claim 9, wherein the opening has a length ranging from 0.1 meters to 5 meters.

11. The method of claim 9, wherein conveying the solids material being processed along the surface of the bed deck comprises conveying the solids material being processed along an upward slope of the bed deck such that solvent carried by solids traveling along the bed deck drains downwardly under the force of gravity back into the solvent pool.

12. The method of claim 11, further comprising introducing incoming solvent onto the bed deck, causing the incoming solvent to flow into the solvent pool in an opposite direction from a direction solids material is conveyed out of the solvent pool along the bed deck.

13. The method of claim 11, wherein the bed deck is sloped upwardly at an angle ranging from 20 degrees to 60 degrees with respect to ground.

14. The method of claim 9, further comprising recycling solvent drained through the drainage section back to the immersion extractor.

* * * * *